United States Patent
Cowell Senft

[11] Patent Number: 6,143,255
[45] Date of Patent: Nov. 7, 2000

[54] METHOD FOR CONTROLLING ARCING WHILE CHARGING A WEB

[75] Inventor: Donna S. Cowell Senft, Albuquerque, N. Mex.

[73] Assignee: Permacharge Corporation, Rio Rancho, N. Mex.

[21] Appl. No.: 09/249,515

[22] Filed: Feb. 12, 1999

[51] Int. Cl.⁷ .................................................... B01J 19/08
[52] U.S. Cl. ...................... 422/186.04; 361/221; 361/225
[58] Field of Search ....................... 422/186.04; 361/225, 361/221

[56] References Cited

U.S. PATENT DOCUMENTS 4,649,097  3/1987  Tsukada et al. ......................... 430/270
5,295,039  3/1994  Nakajima et al. ....................... 361/225

Primary Examiner—Kishor Mayekar
Attorney, Agent, or Firm—Calvin B. Ward

[57] ABSTRACT

An apparatus for charging a web. The apparatus includes a charging electrode disposed on one side of the web and an insulating roller for supporting the web. The insulating roller is disposed on the other side of the web and is in contact with the web. A discharging electrode is provided in contact with the insulating roller for removing charge from a surface of the insulating roller as the roller rotates. In the preferred embodiment of the present invention, the charging electrode is held at a first constant potential, and the discharge electrode is held at a second constant potential.

3 Claims, 1 Drawing Sheet

METHOD FOR CONTROLLING ARCING WHILE CHARGING A WEB

FIELD OF THE INVENTION

The present invention relates to the charging of plastic sheets or webs, and more particularly, to a method that reduces damage caused by arcing during the charging process.

BACKGROUND OF THE INVENTION

Electrically charged sheets, ie., electrets, are particularly attractive as a medium for printing posters and the like. These sheets stick to vertical surfaces via an electrostatic attraction, and hence, the sheets may be affixed to walls, windows, and the like without the use of fasteners or adhesives.

Electrets have been used in filters for some time. In such applications, a fibrous web is charged either by a hot or cold charging process. Hot charging processes are disclosed in U.S. Pat. No. 4,215,682 to Kubik, et al., U.S. Pat. No. 4,904,174 to Moosmayer, et al., and U.S. Pat. No. 5,122,048 to Deeds. These processes operate on fibrous web materials by charging meltblown fibers with an electrostatic charge immediately after they are formed and then deposited in a web. Such fibrous webs are not suitable for high quality printing applications. Further, the cost of such webs detracts from their attractiveness as a paper substitute.

There are also several cold charging processes for the preparation of charged webs. For example, U.S. Pat. No. 4,375,718 to Wadsworth, et al., and U.S. Pat. No. 4,588,537 to Klaase, et al., describe processes for the corona charging of webs made from layers of materials with differing conductivities. U.S. Pat. No. 4,592,815 to Nakao describes placing a nonconductive web between the surface of a grounded metal electrode and a series of discharge electrodes. U.S. Pat. No. 5,686,050 to Wadsworth, et al. discloses a corona charging method that uses a single electrode and a curved conducting roller to charge a fibrous web.

The degree to which the electret film is charged is important in both filtration and printing applications. Hence, it is advantageous to use as high an electric field as possible when charging the material. The high electric fields lead to arcing between the electrodes. While fibrous webs for use in filtration systems can sustain a significant amount of arcing damage, films for printing purposes cannot. When an arc forms between the charging electrodes the film is pierced, forming a small hole or other blemish. These blemishes can render the film useless as a print medium for high quality printed posters.

The prior art corona charging processes attempt to control arcing by shaping the electric field near the charging electrodes to prevent field gradients that can cause arcing. However, such solutions are less than perfect. Changes in humidity, particulate material, or the surface conditions of the rollers can lead to arcing even when the solutions presented in the prior art are utilized.

Broadly, it is the object of the present invention to provide an improved method and apparatus for charging a sheet or web.

It is a further object of the present invention to provide an improved method and apparatus for charging a sheet or web in which arcing is more easily controlled.

These and other objects of the present invention will become apparent to those skilled in the art from the following detailed description of the invention and the accompanying drawings.

SUMMARY OF THE INVENTION

The present invention is an apparatus for charging a web. The apparatus includes a charging electrode disposed on one side of the web and an insulating roller for supporting the web. The insulating roller is disposed on the other side of the web and is in contact with the web. A discharging electrode is provided in contact with the insulating roller for removing charge from a surface of the insulating roller as the roller rotates. In the preferred embodiment of the present invention, the charging electrode is held at a first constant potential, and the discharge electrode is held at a second constant potential.

DETAILED DESCRIPTION OF THE INVENTION

Figure 1:
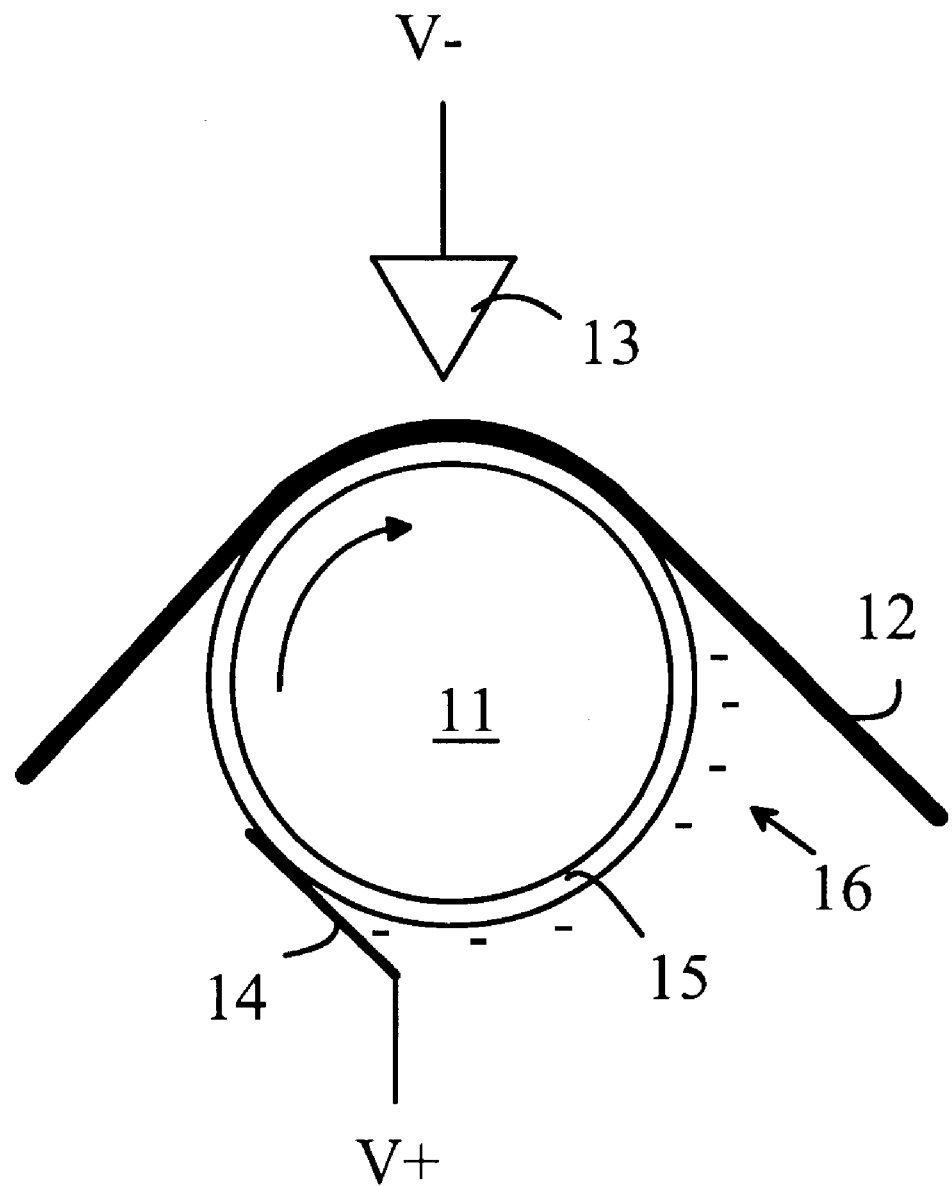
FIG. 1 is a cross-sectional view of a charging apparatus for charging a film according to the present invention.

In prior art charging schemes, the web typically passes between two conducting electrodes that are maintained at a high potential difference. One electrode is usually a conducting roller which supports the web. Such charging schemes depend on the web and the air interface between the web and the other charging electrode to prevent arcing. The web provides an insulating layer that prevents the electrodes from shorting by striking an arc between the electrodes. Unfortunately, the films or webs used for printing media are thin, typically less than 5 mils. In addition, the films may have pin holes or other imperfections. The insulating quality of the film in the region of such imperfections is reduced, and hence, arcs can form through the imperfections. The arcs damage the film in a manner that renders it useless for high quality printing applications.

The air gap between the charging electrode and the web can break down for a number of reasons. For example, changes in humidity can alter the breakdown threshold. In addition, small imperfections on the charging electrode can generate regions of high electric field that will preferentially initiate arcing. Hence, any loss of insulating quality in the web can result in arcing that is sustained for a period of time even after the imperfection has passed out of the electric field. Accordingly a pin hole can give rise to an extended imperfection on the charged film.

Refer now to FIG. 1 which is a cross-sectional view of a charging apparatus 10 according to the present invention for charging a film 12. Film 12 is charged by passing the film through an electric field generated by electrode 13 while film 12 passes under electrode 13. Film 12 is supported on a roller 11 having an insulating sleeve 15.

Insulating cover 15 prevents a sustained arc from forming between electrode 13 and roller 11. If an arc attempts to form because of an imperfection in film 12, charge immediately builds up on the surface of insulating sleeve 15. The charge on sleeve 15 reduces the potential across the air gap in the region of the imperfection, and thus prevents arcing by quenching the breakdown of the air. The charge 16 that accumulates on sleeve 15 is removed by a conducting brush 14, which is maintained at a fixed potential relative to charging electrode 13. In the preferred embodiment of the present invention, roller 11 is also maintained at this potential which is preferably ground.

The above described embodiment of the present invention utilizes a fixed charging potential. However, it will be obvious to those skilled in the art from the preceding discussion that an AC charging potential may also be utilized.

The charging electrode described above may be a smooth cylindrical or flat electrode or have a series of sharp points thereon for increasing the electric field. The present invention is particularly well suited to charging electrodes having points, as such electrodes tend to arc more readily than smooth surfaced electrodes.

Various modifications to the present invention will become apparent to those skilled in the art from the foregoing description and accompanying drawings. Accordingly, the present invention is to be limited solely by the scope of the following claims.

What is claimed is:

1. An apparatus for charging a web, said apparatus comprising:

a charging electrode disposed on one side of said web;

an insulating roller for supporting said web, said insulating roller being disposed on the other side of said web and being in contact with said web, and a discharging electrode in contact with said insulating roller for removing charge from a surface of said insulating roller as said roller rotates.

2. The apparatus of claim 1 wherein said charging electrode is held at a first constant potential and said discharge electrode is held at a second constant potential.

3. The apparatus of claim 1 wherein said insulating roller comprises a conducting roller covered with an insulating coating, said conducting roller being held at said second constant potential.

* * * * *